US010035904B2

(12) United States Patent
Tourenne et al.

(10) Patent No.: US 10,035,904 B2
(45) Date of Patent: Jul. 31, 2018

(54) BICYCLE TIRE

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Annabel Tourenne, Clermont-Ferrand (FR); François-Xavier Gibert, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(*) Notice: Subject to any disclaimer, the term of this patent is extended or adjusted under 35 U.S.C. 154(b) by 0 days.

(21) Appl. No.: 15/104,741

(22) PCT Filed: Dec. 16, 2014

(86) PCT No.: PCT/EP2014/078051
§ 371 (c)(1),
(2) Date: Jun. 15, 2016

(87) PCT Pub. No.: WO2015/091541
PCT Pub. Date: Jun. 25, 2015

(65) Prior Publication Data
US 2016/0319113 A1    Nov. 3, 2016

(30) Foreign Application Priority Data
Dec. 18, 2013    (FR) ..................................... 13 62857

(51) Int. Cl.
*C08L 9/06*    (2006.01)
*B60C 1/00*    (2006.01)

(52) U.S. Cl.
CPC .............. *C08L 9/06* (2013.01); *B60C 1/0016* (2013.01)

(58) Field of Classification Search
None
See application file for complete search history.

(56) References Cited

U.S. PATENT DOCUMENTS

| 5,977,238 A | 11/1999 | Labauze |
| 6,013,718 A | 1/2000 | Cabioch et al. |
| 6,503,973 B2 | 1/2003 | Robert et al. |
| 6,610,261 B1 | 8/2003 | Custodero et al. |
| 6,747,087 B2 | 6/2004 | Custodero et al. |
| 6,815,473 B2 | 11/2004 | Robert et al. |
| 7,259,205 B1 | 8/2007 | Pagliarini et al. |
| 2006/0089445 A1 | 4/2006 | Gandon-Pain |
| 2012/0165446 A1* | 6/2012 | Makiuchi ............. B60C 1/00 524/186 |
| 2014/0171557 A1* | 6/2014 | Ringot ............. B60C 1/0016 524/83 |

FOREIGN PATENT DOCUMENTS

| EP | 0784072 A1 | 7/1997 |
| EP | 1127909 A1 | 8/2001 |
| FR | 2740778 A1 | 5/1997 |
| FR | 2765882 A1 | 1/1999 |
| WO | 9637547 A2 | 11/1996 |
| WO | 9736724 A2 | 10/1997 |
| WO | 9916600 A1 | 4/1999 |
| WO | 9928380 A1 | 6/1999 |
| WO | 0192402 A1 | 12/2001 |
| WO | 03016387 A1 | 2/2003 |
| WO | 2004096865 A2 | 11/2004 |
| WO | 2006069792 A1 | 6/2006 |
| WO | 200606069793 A1 | 6/2006 |
| WO | 2006125533 A1 | 11/2006 |
| WO | 2007003408 A1 | 1/2007 |
| WO | 2007017060 A1 | 2/2007 |
| WO | 2008003434 A1 | 1/2008 |
| WO | 2008003435 A1 | 1/2008 |
| WO | 2008141702 A1 | 11/2008 |
| WO | 2009000750 A1 | 12/2008 |
| WO | 2009000752 A1 | 12/2008 |
| WO | 2009062733 A2 | 5/2009 |
| WO | 2010072761 A1 | 7/2010 |
| WO | WO-2012152696 A1 * | 11/2012 ........... B60C 1/0016 |

OTHER PUBLICATIONS

International Search Report dated Mar. 6, 2015.
Hydrocarbon Resins by R. Mildenberg, M. Zander and G. Collin (New York, VCH, 1997, ISBN 3-527-28617-9) Chapter 5.

* cited by examiner

*Primary Examiner* — Wenwen Cai
(74) *Attorney, Agent, or Firm* — Dickinson Wright PLLC

(57) ABSTRACT

A bicycle tire comprising at least one rubber composition based on at least one styrene/butadiene copolymer, SBR, having a Tg of greater than or equal to −65° C., at a content of greater than or equal to 50 parts per hundred parts of elastomer, phr, a reinforcing filler at a content of greater than 100 phr comprising at least carbon black, and a plasticizing system at a content of greater than 100 phr is provided. The content of plasticizer is greater than the content of reinforcing filler and the weight fraction of elastomer in the composition is less than or equal to 33%.

19 Claims, No Drawings

BICYCLE TIRE

This application is a 371 national phase entry of PCT/EP2014/078051, filed 16 Dec. 2014, which claims benefit of French Patent Application No. 1362857, filed 18 Dec. 2013, the entire contents of which are incorporated herein by reference for all purposes.

BACKGROUND

1. Technical Field

The invention relates to a bicycle tire, in particular for mountain bikes.

2. Related Art

There are various types of bicycle, including road bikes (optionally that are electric-assisted), mountain bikes, especially intended for practicing amateur or competitive sport in the discipline known as "downhill" which essentially involves descending, "enduro" which involves as much ascending as descending on circuits, or else "cross-country".

The issue with mountain bike tires, in particular for practicing enduro and downhill, is that a very large compromise is required between grip properties and handling properties without having an adverse effect on wear properties. Indeed, grip and handling are essential to allow the rider to control their bike and their trajectory; thus, for example, too great a stiffness would cause the tires to slip on obstacles such as pebbles, or even to bounce back if the hysteresis is too low, and cause the rider to lose control of their bike.

Thus, it is known practice to use, in the elastomer matrix of such tires, optionally in a blend with natural rubber, styrene/butadiene copolymers (SBR) having a high Tg (greater than or equal to −65° C.) and plasticizers; however, the content of plasticizers is limited so as to preserve the wear properties of the tires, even though it is not sought to obtain wear performance which is as high for this type of tire as for road bike tires, for example, or for cross-country bike tires.

SUMMARY

The applicant has discovered, surprisingly, that combining a plasticizer and a reinforcing filler at very high contents within a rubber composition based on at least one SBR with a high Tg made it possible to very notably improve the grip performance of tires with a tread having such a composition, while retaining similar wear to that known for bicycle tires, even though the weight fraction of elastomer present in the composition is very low.

Therefore, one aspect of the invention is a bicycle tire comprising at least one rubber composition based on at least one styrene/butadiene copolymer, SBR, having a Tg of greater than or equal to −65° C., at a content of greater than or equal to 50 parts per hundred parts of elastomer, phr, a reinforcing filler at a content of greater than 100 phr comprising at least carbon black, and a plasticizing system at a content of greater than 100 phr, characterized in that the content of plasticizer is greater than the content of reinforcing filler and in that the weight fraction of elastomer in the composition is less than or equal to 33%, preferably less than or equal to 31%.

Advantageously, the SBR is present in the composition at a content of greater than or equal to 60 phr, preferably greater than or equal to 80 phr.

According to one variant embodiment of the invention, the SBR is the only elastomer of the composition.

According to another variant embodiment of the invention, the SBR is used in a blend with at least one second elastomer, preferably with a diene elastomer and preferably selected from the group consisting of polybutadienes, synthetic polyisoprenes, natural rubber, butadiene copolymers, isoprene copolymers and the mixtures of these elastomers.

According to a preferred embodiment, the second elastomer is a natural rubber, the content of which is less than or equal to 40 phr.

Advantageously, the SBR has a Tg of greater than or equal to −50° C.

The invention also relates to a bicycle tire in which the composition detailed above constitutes the tread of the tire.

Measurements and Tests Used

Shore Hardness

The Shore A hardness of the compositions after curing is measured in accordance with standard ASTM D 2240-86.

Stress at Break

These tensile tests make it possible to determine the elasticity stresses and the properties at break. The stresses at break (in MPa) and the elongations at break (in %) are also measured. All these tensile measurements are carried out at a temperature of 23° C.-2° C. and under standard hygrometry conditions (50-5% relative humidity), according to French Standard NF T 40-101 (December 1979).

Description of Comfort/Endurance and Wear Tests

The tires, mounted on a given bike and inflated to a pressure of 2 bar, are run on an open air 4 km long course intended for practicing enduro. Three bikes are fitted with new control tires and ride the circuit (thus with three different riders), then each rider rides the same circuit on an identical bike fitted with new tires to be tested. The test ends with another ride by each rider with the bike fitted with the control tires, in order to consolidate the comparison. Each of the three bike riders gives a 100 score for grip and for comfort for the control tires (average value for the two rides they have ridden), where a value of greater than 100 for each property indicates a better performance.

The scores obtained are average scores for the data assessed by each of the riders.

For the wear tests, the same control tires and tires under study are tested on open air circuits with a cumulative distance of 200 km, over a period of 4 to 5 days within an interval of one month. In this same month, two runs are carried out with bikes fitted with new control tires and two runs with bikes fitted with new tires to be tested, for each type of tire to be tested. At the end of the 200 km of runs, the state of wear of the tires (averaged over the two runs carried out for each type of tire) is inspected visually and the state of wear of the control tires is compared to that of the tires to be tested. A score of 100 is arbitrarily given to the control tires having completed the 200 km, and a comparison with the state of wear of the tires to be tested makes it possible to attribute a score to the other tires.

A score of greater than 100 indicates that the tires are less worn than the control tires.

DETAILED DESCRIPTION OF EXAMPLE EMBODIMENTS

The bicycle tire according to embodiments of the invention comprises at least one rubber composition based on at least one styrene/butadiene copolymer, SBR, having a Tg of greater than or equal to −65° C., at a content of greater than or equal to 50 parts per hundred parts of elastomer, phr, a reinforcing filler at a content of greater than 100 phr comprising at least carbon black, and a plasticizing system at a content of greater than 100 phr, characterized in that the weight fraction of elastomer in the composition is less than or equal to 33%.

Such compositions may be intended to constitute, in bicycle tires, the tread, the mixtures for the carcass reinforcement plies, the sidewalls, etc.

Unless expressly indicated otherwise, the percentages shown in the present application are % by weight.

In the present description, unless expressly indicated otherwise, all the percentages (%) shown are % by weight. Moreover, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

Diene Elastomer

The term "diene" elastomer (or, equally, rubber), whether natural or synthetic, should be understood in a known way to mean an elastomer consisting at least in part (i.e., a homopolymer or a copolymer) of diene monomer units (monomers bearing two conjugated or non-conjugated carbon-carbon double bonds).

These diene elastomers can be classified into two categories: "essentially unsaturated" or "essentially saturated". Generally, the term "essentially unsaturated" is understood to mean a diene elastomer resulting at least in part from conjugated diene monomers having a content of units of diene origin (conjugated dienes) which is greater than 15% (mol %); thus, diene elastomers such as butyl rubbers or copolymers of dienes and α-olefins of EPDM type do not come under the preceding definition and can especially be classed as "essentially saturated" diene elastomers (low or very low content, always less than 15%, of units of diene origin). In the category of "essentially unsaturated" diene elastomers, the term "highly unsaturated" diene elastomer is understood to mean in particular a diene elastomer having a content of units of diene origin (conjugated dienes) which is greater than 50%.

Given these definitions, the term "diene elastomer capable of being used in the compositions in accordance with the invention" is understood more particularly to mean:

(a)—any homopolymer of a conjugated diene monomer, especially any homopolymer obtained by polymerization of a conjugated diene monomer having from 4 to 12 carbon atoms;

(b)—any copolymer obtained by copolymerization of one or more conjugated dienes with one another or with one or more vinylaromatic compounds having from 8 to 20 carbon atoms;

(c)—a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the above mentioned type, such as, in particular, 1,4-hexadiene, ethylidenenorbornene or dicyclopentadiene;

(d)—a copolymer of isobutene and of isoprene (butyl rubber) and also the halogenated versions, in particular chlorinated or brominated versions, of this type of copolymer.

Although it applies to any type of diene elastomer, those skilled in the art of tires will understand that essentially unsaturated diene elastomers, in particular of the above type (a) or (b), are preferred.

The elastomer matrix of the composition comprises at least:

an SBR having a Tg (Tg measured according to ASTM D3418) of greater than or equal to −65° C., at a content of greater than or equal to 60 phr, preferably greater than or equal to 60 phr, even more preferably greater than or equal to 80 phr. Even more preferably, the SBR has a Tg of greater than or equal to −50° C.

According to one embodiment of the invention, the SBR is the only diene elastomer of the composition.

According to another advantageous embodiment, the SBR is used in a blend with at least one second diene elastomer, preferably selected from the group consisting of polybutadienes, synthetic polyisoprenes, natural rubber, butadiene copolymers, isoprene copolymers and the mixtures of these elastomers.

More preferably, the second elastomer consists of polybutadiene, BR or natural rubber; in this second case, the content of the second elastomer is preferably less than or equal to 40 phr.

The above mentioned elastomers may have any microstructure, which depends on the polymerization conditions used, especially on the presence or absence of a modifying and/or randomizing agent and on the amounts of modifying and/or randomizing agent employed. The elastomers may, for example, be block, statistical, sequential or microsequential elastomers and may be prepared in dispersion or in solution; they may be coupled and/or star-branched or else functionalized with a coupling and/or star-branching or functionalization agent. For coupling to carbon black, mention may for example be made of functional groups comprising a C—Sn bond or aminated functional groups, such as aminobenzophenone, for example; for coupling to a reinforcing inorganic filler such as silica, mention may for example be made of silanol functional groups or polysiloxane functional groups having a silanol functional groups end (such as described, for example, in FR 2 740 778 or U.S. Pat. No. 6,013,718 and WO 2008/141702), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or else polyether groups (such as described, for example, in EP 1 127 909 or U.S. Pat. No. 6,503,973, WO 2009/000750 and WO 2009/000752).

As functional elastomers, mention may also be made of those prepared using a functional initiator, especially those bearing an amine or tin functional group (see, for example, WO 2010/072761).

As other examples of functionalized elastomers, mention may also be made of elastomers (such as SBR, BR, NR or IR) of the epoxidized type.

It will be noted that the SBR may be prepared as emulsion (ESBR) or prepared as solution (SSBR).

Whether it is ESBR or SSBR, use is especially made of an SBR having a moderate styrene content, for example of between 10% and 35% by weight, or a high styrene content, for example from 35% to 55%, a content of vinyl bonds of the butadiene part of between 15% and 70%, a content (mol %) of trans-1,4-bonds of between 15% and 75% and a Tg of between −10° C. and −65° C., preferably of greater than or equal to −50° C.

BRs having a content (mol %) of cis-1,4-linkages of greater than 90% are suitable as BR.

The composition may contain another diene elastomer. The diene elastomers of the composition may be used in combination with any type of synthetic elastomer other than a diene elastomer, indeed even with polymers other than elastomers, for example thermoplastic polymers.

Reinforcing Filler, Coupling Agent and Covering Agent

The composition comprises any type of reinforcing filler known for its abilities to reinforce a rubber composition which can be used for the manufacture of tires, for example an organic filler such as carbon black, a reinforcing inorganic filler, such as silica, with which a coupling agent is combined in a known way, or else a mixture of these two types of filler.

All carbon blacks, especially the blacks conventionally used in tires or their treads ("tire-grade" blacks), are suitable as carbon blacks. Among the latter, mention will more particularly be made of the reinforcing carbon blacks of the 100, 200 or 300 series, such as, for example, the N115, N134, N234, N326, N330, N339, N347 or N375 blacks. These carbon blacks may be used in the isolated state, as available commercially, or in any other form, for example as support for some of the rubber-making additives used. The carbon blacks might, for example, be already incorporated in the diene elastomer, in particular isoprene elastomer, in the form of a masterbatch (see, for example, applications WO 97/36724 or WO 99/16600). The carbon blacks partially or completely covered with silica via a post-treatment, or the carbon blacks modified in situ by silica such as, non-limitingly, the fillers sold by the company Cabot Corporation under the name Ecoblack™ CRX 2000 or CRX4000, are also suitable as carbon black.

As examples of organic fillers other than carbon blacks, mention may be made of functionalized polyvinyl organic fillers, as described in applications WO-A-2006/069792, WO-A-2006/069793, WO-A-2008/003434 and WO-A-2008/003435.

The term "reinforcing inorganic filler" should be understood here as meaning any inorganic or mineral filler, irrespective of its color and its origin (natural or synthetic), also known as "white filler", "clear filler" or even "non-black filler", in contrast to carbon black, capable of reinforcing, by itself alone, without means other than an intermediate coupling agent, a rubber composition intended for the manufacture of pneumatic tires, in other words capable of replacing, in its reinforcing role, a conventional tire-grade carbon black; such a filler is generally characterized, in a known way, by the presence of hydroxyl (—OH) groups at its surface.

Mineral fillers of the siliceous type, preferably silica ($SiO_2$), are especially suitable as reinforcing inorganic fillers. The silica used can be any reinforcing silica known to those skilled in the art, in particular any precipitated or fumed silica having a BET surface area and a CTAB specific surface area both of less than 450 $m^2/g$, preferably from 30 to 400 $m^2/g$, especially between 60 and 300 $m^2/g$. As highly dispersible precipitated silicas ("HDSs"), mention will be made, for example, of the Ultrasil 7000 and Ultrasil 7005 silicas from Degussa, the Zeosil 1165 MP, 1135 MP and 1115 MP silicas from Rhodia, the Hi-Sil EZ150 G silica from PPG, the Zeopol 8715, 8745 and 8755 silicas from Huber or the silicas with a high specific surface area as described in application WO 03/016387.

As reinforcing inorganic filler, mention will also be made of mineral fillers of the aluminous type, in particular alumina ($Al_2O_3$) or aluminium (oxide)hydroxides, or else reinforcing titanium oxides, for example described in U.S. Pat. No. 6,610,261 and U.S. Pat. No. 6,747,087.

The physical state in which the reinforcing inorganic filler is present is not important, whether it is in the form of powder, micropearls, granules or else beads. Of course, the expression "reinforcing inorganic filler" is also understood to mean mixtures of various reinforcing inorganic fillers, in particular highly dispersible silicas as described above.

Those skilled in the art will understand that a reinforcing filler of another nature, especially organic nature, such as carbon black, might be used as filler equivalent to the reinforcing inorganic filler described in the present section, provided that this reinforcing filler is covered with an inorganic layer, such as silica, or else comprises, at its surface, functional sites, in particular hydroxyl sites, requiring the use of a coupling agent in order to establish the bonding between the filler and the elastomer. By way of example, mention may be made for example of carbon blacks for tires as described for example in the patent documents WO 96/37547 and WO 99/28380.

For the compositions in accordance with embodiments of the invention, the content of total reinforcing filler (carbon black and/or reinforcing inorganic filler such as silica, etc.) is preferably greater than or equal to 100 and less than or equal to 180 phr, preferably less than or equal to 140.

According to one embodiment of the invention, the composition only comprises carbon black as reinforcing filler.

According to another embodiment of the invention, the composition comprises, aside from the carbon black, a reinforcing inorganic filler such as silica; preferably, carbon black is the predominant filler.

In order to couple the reinforcing inorganic filler to the diene elastomer, use is made, in a well-known way, of an at least bifunctional coupling agent (or bonding agent) intended to provide a satisfactory connection, of chemical and/or physical nature, between the inorganic filler (surface of its particles) and the diene elastomer. Use is made in particular of at least bifunctional organosilanes or polyorganosiloxanes.

The content of coupling agent is advantageously less than 20 phr, it being understood that it is generally desirable to use as little as possible thereof. Typically, the content of coupling agent represents from 0.5% to 15% by weight, with respect to the amount of inorganic filler. Its content is preferably between 0.5 and 12 phr, more preferably within a range of from 3 to 10 phr. This content is easily adjusted by those skilled in the art depending on the content of inorganic filler used in the composition.

The rubber compositions may also contain coupling activators when a coupling agent is used, agents for covering the inorganic filler when an inorganic filler is used, or more generally processing aids capable, in a known manner, owing to an improvement of the dispersion of the filler in the rubber matrix and to a lowering of the viscosity of the compositions, of improving their processability in the uncured state. These covering agents are well known (see, for example, patent applications WO 2006/125533, WO 2007/017060 and WO 2007/003408); mention will be made, for example, of hydroxysilanes or hydrolysable silanes such as hydroxysilanes (see, for example, WO 2009/062733), alkylalkoxysilanes, especially alkyltriethoxysilanes such as, for example, 1-octyltriethoxysilane, polyols (for example diols or triols), polyethers (for example polyethylene glycols), primary, secondary or tertiary amines (for example trialkanolamines), hydroxylated or hydrolysable polyorganosiloxanes (for example α,ω-dihydroxypolyorganosilanes, especially α,ω-dihydroxypolydimethylsiloxanes) (see, for example, EP 0 784 072), and fatty acids such as, for example, stearic acid.

Plasticizing System

The rubber compositions use a plasticizing system which may especially consist of a plasticizing oil and/or a plasticizing resin.

Thus, these compositions comprise an extender oil (or plasticizing oil), the usual function of which is to improve the processability by lowering the Mooney plasticity.

At ambient temperature (23° C.), these oils, which are more or less viscous, are liquids (that is to say, as a reminder, substances which have the ability to eventually assume the shape of their container), in contrast in particular to resins or rubbers, which are by nature solid.

Preferably, the extender oil is selected from the group consisting of polyolefinic oils (that is to say, resulting from the polymerization of monoolefinic or diolefinic olefins), paraffinic oils, naphthenic oils (of low or high viscosity), aromatic oils, mineral oils and the mixtures of these oils.

The number-average molecular weight (Mn) of the extender oil is preferably between 200 and 25,000 g/mol, more preferably still between 300 and 10,000 g/mol. For excessively low Mn weights, there is a risk of migration of the oil outside the composition, whereas excessively high weights can result in excessive stiffening of this composition. An Mn weight of between 350 and 4000 g/mol, in particular between 400 and 3000 g/mol, has proved to constitute an excellent compromise for the targeted applications, in particular for use in a tire.

The number-average molecular weight (Mn) of the extender oil is determined by SEC, the sample being dissolved beforehand in tetrahydrofuran at a concentration of approximately 1 g/l; the solution is then filtered through a filter with a porosity of 0.45 μm before injection. The apparatus is the Waters Alliance chromatographic line. The elution solvent is tetrahydrofuran, the flow rate is 1 ml/min, the temperature of the system is 35° C. and the analytical time is 30 min. A set of two Waters columns with the Styragel HT6E name is used. The injected volume of the solution of the polymer sample is 100 μl. The detector is a Waters 2410 differential refractometer, and its associated software, for making use of the chromatographic data, is the Waters Millennium system. The calculated average molar masses are relative to a calibration curve produced with polystyrene standards.

The rubber compositions may also use a plasticizing hydrocarbon resin, the Tg, glass transition temperature, of which is greater than 20° C. and the softening point of which is less than 170° C., as explained in detail below.

In a way known to those skilled in the art, the name "plasticizing resin" is reserved in the present application, by definition, for a compound which is, on the one hand, solid at ambient temperature (23° C.) (in contrast to a liquid plasticizing compound, such as an oil) and, on the other hand, compatible (that is to say, miscible at the content used, typically of greater than 5 phr) with the rubber composition for which it is intended, so as to act as a true diluting agent.

Hydrocarbon resins are polymers well known to those skilled in the art which are thus miscible by nature in elastomer compositions, when they are additionally classed as "plasticizing".

They have been widely described in the patents or patent applications mentioned in the introduction to the present document and also, for example, in the work entitled "Hydrocarbon Resins" by R. Mildenberg, M. Zander and G. Collin (New York, VCH, 1997, ISBN 3-527-28617-9), Chapter 5 of which is devoted to their applications, in particular in the tire rubber field (5.5. "Rubber Tires and Mechanical Goods").

They may be aliphatic, naphthenic or aromatic or else of the aliphatic/naphthenic/aromatic type, that is to say based on aliphatic and/or naphthenic and/or aromatic monomers. They may be natural or synthetic and may or may not be based on petroleum (if this is the case, they are also known under the name of petroleum resins). They are preferably exclusively hydrocarbons, that is to say that they comprise only carbon and hydrogen atoms.

Preferably, the plasticizing hydrocarbon resin has at least one, more preferably all, of the following characteristics:
  a number-average molecular weight (Mn) of between 400 and 2000 g/mol;
  a polydispersity index (PDI) of less than 3 (reminder: PDI=Mw/Mn with Mw being the weight-average molecular weight).

More preferably, this plasticizing hydrocarbon resin has at least one, more preferably still all, of the following characteristics:
  a Tg of greater than 30° C.;
  a weight Mn of between 500 and 1500 g/mol;
  a PDI index of less than 2.

The glass transition temperature Tg is measured in a known way by DSC (Differential Scanning Calorimetry) according to Standard ASTM D3418 (1999) and the softening point is measured according to Standard ASTM E-28.

The macrostructure (Mw, Mn and PDI) of the hydrocarbon resin is determined by size exclusion chromatography (SEC): solvent tetrahydrofuran; temperature 35° C.; concentration 1 g/l; flow rate 1 ml/min; solution filtered through a filter with a porosity of 0.45 μm before injection; Moore calibration with polystyrene standards; set of 3 Waters columns in series (Styragel HR4E, HR1 and HR0.5); detection by differential refractometer (Waters 2410) and its associated operating software (Waters Empower).

According to a particularly preferred embodiment, the plasticizing hydrocarbon resin is selected from the group consisting of cyclopentadiene (abbreviated to CPD) or dicyclopentadiene (abbreviated to DCPD) homopolymer or copolymer resins, terpene homopolymer or copolymer resins, $C_5$ fraction homopolymer or copolymer resins and the mixtures of these resins.

Use is preferably made, among the above copolymer resins, of those selected from the group consisting of (D)CPD/vinylaromatic copolymer resins, (D)CPD/terpene copolymer resins, (D)CPD/$C_5$ fraction copolymer resins, terpene/vinylaromatic copolymer resins, $C_5$ fraction/vinylaromatic copolymer resins and the mixtures of these resins.

The term "terpene" groups together here, in a known way, α-pinene, β-pinene and limonene monomers; use is preferably made of a limonene monomer, a compound which exists, in a known way, in the form of three possible isomers: L-limonene (laevorotatory enantiomer), D-limonene (dextrorotatory enantiomer) or else dipentene, a racemate of the dextrorotatory and laevorotatory enantiomers.

Suitable as vinylaromatic monomer are, for example: styrene, α-methylstyrene, ortho-, meta- or para-methylstyrene, vinyltoluene, para-(tert-butyl)styrene, methoxystyrenes, chlorostyrenes, vinylmesitylene, divinylbenzene, vinylnaphthalene or any vinylaromatic monomer resulting from a $C_9$ fraction (or more generally from a $C_8$ to $C_{10}$ fraction). Preferably, the vinylaromatic compound is styrene or a vinylaromatic monomer resulting from a $C_9$ fraction (or more generally from a $C_8$ to $C_{10}$ fraction). Preferably, the vinylaromatic compound is the minor monomer, expressed as molar fraction, in the copolymer under consideration.

According to a more particularly preferred embodiment, the plasticizing hydrocarbon resin is selected from the group consisting of (D)CPD homopolymer resins, (D)CPD/styrene copolymer resins, polylimonene resins, limonene/styrene copolymer resins, limonene/D(CPD) copolymer resins, $C_5$ fraction/styrene copolymer resins, $C_5$ fraction/$C_9$ fraction copolymer resins and the mixtures of these resins.

The preferred resins above are well known to those skilled in the art and are commercially available, for example sold as regards:

polylimonene resins: by DRT under the name Dercolyte L120 (Mn=625 g/mol; Mw=1010 g/mol; PDI=1.6; Tg=72° C.) or by Arizona under the name Sylvagum TR7125C (Mn=630 g/mol; Mw=950 g/mol; PDI=1.5; Tg=70° C.);

$C_5$ fraction/vinylaromatic copolymer resins, in particular $C_5$ fraction/styrene or $C_5$ fraction/$C_9$ fraction copolymer resins: by Neville Chemical Company under the names Super Nevtac 78, Super Nevtac 85 and Super Nevtac 99, by Goodyear Chemicals under the name Wingtack Extra, by Kolon under the names Hikorez T1095 and Hikorez T1100 or by Exxon under the names Escorez 2101 and ECR 373;

limonene/styrene copolymer resins: by DRT under the name Dercolyte TS 105 from DRT or by Arizona Chemical Company under the names ZT115LT and ZT5100.

The content of plasticizing system is greater than or equal to 100 phr and preferably less than or equal to 180 phr, and even more preferably between 110 and 160 phr. Below the minimum indicated, the targeted technical effect can prove to be insufficient whereas, above the maximum, the tackiness of the compositions in the raw state, with regard to the compounding devices, can in some cases become unacceptable from the industrial viewpoint.

According to one embodiment, the plasticizing system consists predominantly, or even solely, of plasticizing oil.

According to another embodiment, the plasticizing system predominantly comprises plasticizing oil and also a plasticizing resin, with a content preferably of between 15 and 80 phr, more preferably less than or equal to 60 phr.

Crosslinking System

The crosslinking system is preferably a vulcanization system, that is to say a system based on sulphur (or on a sulphur-donating agent) and on a primary vulcanization accelerator. Additional to this base vulcanization system are various known secondary vulcanization accelerators or vulcanization activators, such as zinc oxide, stearic acid or equivalent compounds, or guanidine derivatives (in particular diphenylguanidine), incorporated during the first non-productive phase and/or during the productive phase, as described subsequently.

The sulphur is used at a preferred content of between 0.5 and 10 phr, more preferably of between 1 and 8 phr, in particular between 1 and 6 phr, when the composition is intended to constitute an internal "gum" (or rubber composition) of a tire. The primary vulcanization accelerator is used at a preferred content of between 0.5 and 10 phr, more preferably of between 0.5 and 5.0 phr.

Use may be made, as accelerator, of any compound capable of acting as accelerator for the vulcanization of diene elastomers in the presence of sulphur, in particular accelerators of the thiazole type, and also their derivatives, and accelerators of thiuram and zinc dithiocarbamate types. These primary accelerators are more preferably selected from the group consisting of 2-mercaptobenzothiazole disulphide (abbreviated to "MBTS"), N-cyclohexyl-2-benzothiazolesulphenamide (abbreviated to "CBS"), N,N-dicyclohexyl-2-benzothiazolesulphenamide (abbreviated to "DCBS"), N-(tert-butyl)-2-benzothiazolesulphenamide (abbreviated to "TBBS"), N-(tert-butyl)-2-benzothiazolesulphenimide (abbreviated to "TBSI") and the mixtures of these compounds.

Other Constituents

The rubber matrices of the composites also comprise all or some of the additives customarily used in the rubber compositions intended for the manufacture of motor vehicle ground-contact systems, in particular tires, such as for example anti-aging agents, antioxidants, plasticizers or extending oils, whether the latter are of aromatic or non-aromatic nature, especially oils that are very slightly aromatic or non-aromatic (e.g. naphthenic or paraffinic oils, MES or TDAE oils), agents that improve the processability of the compositions in the uncured state, a crosslinking system based either on sulphur, or on sulphur donors and/or peroxide, vulcanization accelerators, activators or retarders, anti-reversion agents such as for example sodium hexathiosulphonate or N,N'-m-phenylene-biscitraconimide, methylene acceptors and donors (for example resorcinol, HMT or H3M) or other reinforcing resins, bismaleimides, other systems for promoting adhesion with respect to metallic reinforcers, especially brass reinforcers, such as for example those of "RFS" (resorcinol-formaldehyde-silica) type, or else other metal salts such as for example organic salts of cobalt or nickel. Those skilled in the art will know how to adjust the formulation of the composition depending on their specific requirements.

Preparation of the Rubber Compositions

The compositions are manufactured in appropriate mixers, using two successive phases of preparation well known to those skilled in the art: a first phase of thermomechanical working or kneading ("non-productive" phase) at high temperature, up to a maximum temperature of between 110° C. and 190° C., preferably between 130° C. and 180° C., followed by a second phase of mechanical working ("productive" phase) down to a lower temperature, typically of less than 110° C., during which finishing phase the crosslinking system is incorporated.

By way of example, the non-productive phase is carried out in a single thermomechanical stage of a few minutes (for example between 2 and 10 minutes) during which all the necessary base constituents and other additives, with the exception of the crosslinking or vulcanization system, are introduced into an appropriate mixer, such as an ordinary internal mixer. After cooling the mixture thus obtained, the vulcanization system is then incorporated in an external mixer, such as an open mill, maintained at a low temperature (for example between 30° C. and 100° C.). The combined mixture is then mixed (productive phase) for a few minutes (for example between 5 and 15 min). Those skilled in the art know to adjust this time period as a function of the tack of the mixtures produced.

The finished composition thus obtained may then be calendered, for example in the form of a sheet or a slab, or else extruded, for example in order to form a rubber profiled element used for the manufacture of a composite or a semi-finished product, such as, for example, plies, treads, sublayers, and other blocks of rubber reinforced by reinforcers, intended to form for example a part of the structure of a tire.

The vulcanization (or curing) may then be carried out in a known way at a temperature generally of between 130° C.

and 200° C., preferably under pressure, for a sufficient time which can vary, for example, between 5 and 90 min, as a function especially of the curing temperature, of the vulcanization system adopted and of the kinetics of vulcanization of the composition under consideration.

It will be noted that the invention relates to the rubber compositions described above, both in the "uncured" state (i.e., before curing) and in the "cured" or vulcanized state (i.e., after vulcanization).

Exemplary Embodiments

The examples which follow make it possible to illustrate the invention; however, the invention cannot be limited to these examples alone.

III-1 Preparation of the Rubber Compositions

The following tests are carried out in the following way: the diene elastomer (in this instance ESBR), the reinforcing filler (carbon black), and then, after kneading for one to two minutes, the various other ingredients, with the exception of the vulcanization system, are introduced into an internal mixer which is 70% filled and which has an initial vessel temperature of approximately 60° C. Thermomechanical working is then carried out (non-productive phase) in one stage (total duration of the kneading equal to approximately 5 min), until a maximum "dropping" temperature of approximately 140° C. is reached. The mixture thus obtained is recovered and cooled and then the vulcanization system (sulphur and sulphenamide accelerator) is added on an external mixer (homofinisher) at 70° C., everything being mixed (productive phase) for approximately 5 to 6 min.

The compositions thus obtained are subsequently calendered, either in the form of slabs (thickness of 2 to 3 mm) or thin sheets of rubber, for the measurement of their physical or mechanical properties, or in the form of profiled elements which can be used directly, after cutting and/or assembling to the desired dimensions, for example as semi-finished products for tires, in particular as tire treads.

III-2 Test 1

The aim of this test is to show the great improvement in the strain at break properties of the compositions in accordance with the invention compared to a control corresponding to the compositions conventionally used for mountain bike tires intended for enduro and to six other compositions not in accordance with the invention.

For this purpose, eight compositions based on ESBR reinforced with carbon black in accordance with the method described in section III-1 were prepared.

These six compositions differ from one another by the content of carbon black and the content of plasticizer used.

control composition C1 conventionally used for mountain bike tires intended for practicing enduro comprises an identical content of plasticizer and carbon black (80 phr), composition C2 not in accordance with the invention comprises an identical content of plasticizer and carbon black (90 phr), composition C3 not in accordance with the invention comprises an identical content of plasticizer and carbon black (100 phr), composition C4 not in accordance with the invention comprises an identical content of plasticizer and carbon black (120 phr), composition C5 not in accordance with the invention comprises a higher content of carbon black than that of plasticizer (120 and 100 phr, respectively), composition C6 in accordance with the invention comprises a lower content of carbon black than that of plasticizer (100 and 120 phr, respectively), composition C7 not in accordance with the invention comprises an identical content of plasticizer and carbon black (150 phr), composition C8 in accordance with the invention comprises a lower content of carbon black than that of plasticizer (130 and 150 phr, respectively), Tables 1 and 2 give, respectively, the formulation of the various compositions (Table 1-content of the various products expressed in phr) and the properties after curing (approximately 20 min at 150° C.).

Examining Table 2 shows, surprisingly, that the strain at break property of the compositions in accordance with the invention C6 and C8 is markedly improved compared to all the compositions, including composition C7 which contains 150 phr of plasticizer.

It is also observed that the compositions in accordance with the invention C6 and C8 have a very low Shore hardness compared to all the other compositions.

It therefore appears clearly that combining high contents of filler and plasticizers with a relative positioning of these contents in relation to one another makes it possible, surprisingly, to improve the strain at break, which has the consequence of improving the grip of a tire including such a composition in its tread.

III-2 Test 2

The aim of this test is to demonstrate that, contrary to that which is expected by those skilled in the art, mountain bike tires intended for practicing enduro which include compositions in accordance with the invention in their tread not only have improved properties of comfort/endurance, but also retain wear properties which are comparable to those of tires conventionally used for these same bikes.

Mountain bike tires intended for practicing enduro were produced with treads containing the compositions C1, C6 and C8 described in test 1.

These tires were subjected to the comfort/endurance and wear tests described above.

The results of these tests are given in Table 3.

It is observed that the tires with treads which comprise compositions in accordance with the invention C6 and C8 have a very marked improvement both in grip and comfort, without there being a degradation in wear performance compared to the control tires. This result is all the more surprising since the results from test 1 showed that compositions C6 and C8 had a very low Shore hardness, which could have been detrimental to the wear properties.

Thus, mountain bike tires comprising compositions in accordance with the invention combining high contents of filler and plasticizers with a relative positioning of these contents in relation to one another make it possible, surprisingly, to improve both the properties of handling and of grip without degrading the wear properties of these tires.

TABLE 1

| | Composition No. | | | | | | | |
|---|---|---|---|---|---|---|---|---|
| | C1 | C2 | C3 | C4 | C5 | C6 | C7 | C8 |
| ESBR (1) | 137.5 | 137.5 | 137.5 | 137.5 | 137.5 | 137.5 | 137.5 | 137.5 |
| Carbon black (2) | 80 | 90 | 100 | 120 | 120 | 100 | 150 | 130 |
| MES Oil (3) | 17.5 | 27.5 | 37.5 | 57.5 | 37.5 | 57.5 | 57.5 | 57.5 |
| Resin (4) | 25 | 25 | 25 | 25 | 25 | 25 | 55 | 55 |
| Ozone wax | 5.5 | 5.5 | 5.5 | 5.5 | 5.5 | 5.5 | 5.5 | 5.5 |

TABLE 1-continued

| | Composition No. | | | | | | | |
|---|---|---|---|---|---|---|---|---|
| | C1 | C2 | C3 | C4 | C5 | C6 | C7 | C8 |
| Antioxidant (5) | 2 | 2 | 2 | 2 | 2 | 2 | 2 | 2 |
| ZnO (6) | 3 | 3 | 3 | 3 | 3 | 3 | 3 | 3 |
| Stearic acid (7) | 2 | 2 | 2 | 2 | 2 | 2 | 2 | 2 |
| Sulphur | 3 | 3 | 3 | 3 | 3 | 3 | 3 | 3 |
| Accelerator (8) | 2 | 2 | 2 | 2 | 2 | 2 | 2 | 2 |

(1) ESBR: 40% styrene_16% vinyl; 70% trans; 14% cis; Tg s −30° C._(extender oil 37.5 phr TDAE)
(2) Carbon black N234 sold by Cabot Corporation
(3) MES oil Catenex SNR from Shell
(4) $C_5/C_9$ fraction resin sold by Cray Valley under the name THER 8644 resin (Tg = 44° C.)
(5) N-(1,3-dimethylbutyl)-N-phenyl-para-phenylenediamine sold by Flexsys under the name Santoflex 6-PPD
(6) Zinc oxide (industrial grade, sold by Umicore);
(7) stearin sold by Uniqema under the name Pristerene 4931
(8) N-cyclohexyl-2-benzothiazolesulphenamide sold by Flexsys under the name Santocure CBS

TABLE 2

| | Composition No. | | | | | | | |
|---|---|---|---|---|---|---|---|---|
| | C1 | C2 | C3 | C4 | C5 | C6 | C7 | C8 |
| Shore hardness | 55 | 56 | 56 | 64 | 56 | 48 | 58 | 46 |
| Strain at break | 435 | 453 | 499 | 379 | 490 | 522 | 427 | 538 |

TABLE 3

| Composition used in tread | C1 | C6 | C8 |
|---|---|---|---|
| Grip | 100 | 140 | 150 |
| Comfort | 100 | 130 | 140 |
| Wear | 100 | 100 | 100 |

The invention claimed is:

1. A bicycle tire comprising:
   at least one elastomer composition comprising at least one styrene/butadiene copolymer, SBR, having a Tg of greater than or equal to −65° C., at a content of greater than or equal to 80 parts per hundred parts of elastomer, phr,
   a reinforcing filler at a content of greater than 100 phr comprising at least carbon black, and
   a plasticizing system at a content of greater than 100 phr, wherein the content of plasticizer is greater than the content of reinforcing filler and the weight fraction of elastomer in the composition is less than or equal to 33%.

2. The tire according to claim 1, in which the weight fraction of elastomer in the composition is less than or equal to 31%.

3. The tire according to claim 1, in which the SBR is the only elastomer of the composition.

4. The tire according to claim 1, in which the SBR is used in a blend with at least one second elastomer which is different from the SBR.

5. The tire according to claim 4, in which the second elastomer is a diene elastomer.

6. The tire according to claim 5, in which the second diene elastomer is selected from the group consisting of polybutadienes, synthetic polyisoprenes, natural rubber, butadiene copolymers, isoprene copolymers and mixtures therefor.

7. The tire according to claim 6, in which the second elastomer consists of polybutadiene, BR.

8. The tire according to claim 6, in which the second elastomer consists of natural rubber.

9. The tire according to claim 1, in which the SBR has a Tg of greater than or equal to −50° C.

10. The tire according to claim 1, in which the content of reinforcing filler is less than or equal to 140 phr.

11. The tire according to claim 1, in which carbon black is the only reinforcing filler of the composition.

12. The tire according to claim 1, in which the reinforcing filler comprises a blend of carbon black and a reinforcing inorganic filler.

13. The tire according to claim 12, in which the carbon black is predominant.

14. The tire according to claim 12, in which the inorganic filler consists of silica.

15. The tire according to claim 1, in which the content of plasticizing system is less than or equal to 180 phr.

16. The tire according to claim 15, in which the content of plasticizing system is between 110 and 160 phr.

17. The tire according to claim 1, in which the plasticizing system comprises at least one plasticizing resin.

18. The tire according to claim 17, in which the content of plasticizing resin is between 15 and 80 phr.

19. The tire according to claim 1, in which the composition constitutes the tread of the tire.

* * * * *